Aug. 10, 1954

W. H. MAYNE 2,685,815

APPARATUS FOR INDICATING VARIATION
IN OXYGEN CONTENT OF BLOOD

Filed June 14, 1950

INVENTOR.

W. H. Mayne,

By Watson, Cole, Grindle & Watson

Att'ys

Patented Aug. 10, 1954 2,685,815

UNITED STATES PATENT OFFICE 2,685,815

APPARATUS FOR INDICATING VARIATION IN OXYGEN CONTENT OF BLOOD

William Harry Mayne, San Antonio, Tex., assignor to Olive S. Petty, San Antonio, Tex.

Application June 14, 1950, Serial No. 168,027

1 Claim. (Cl. 88—14)

Figures 1, 2:
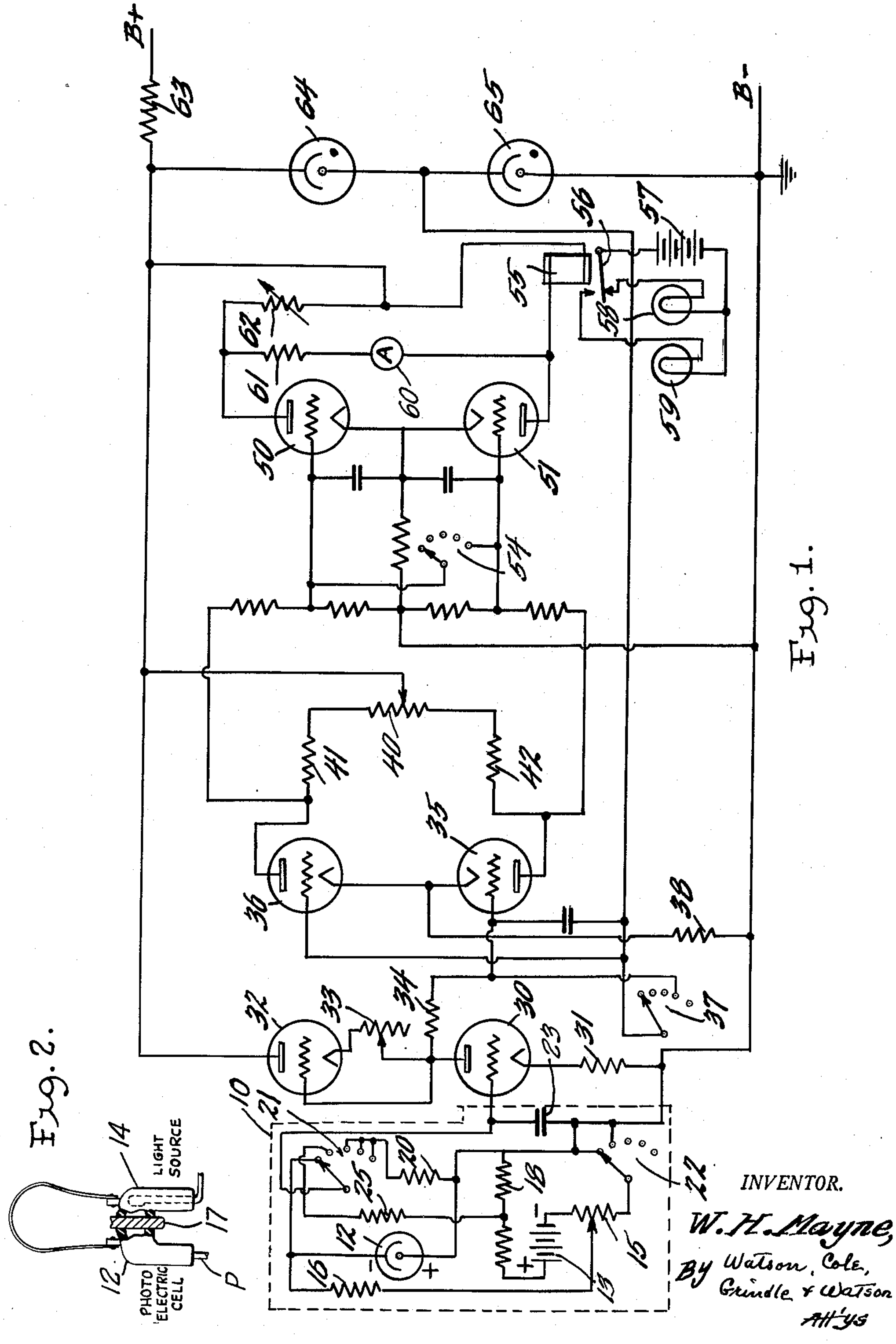

This invention relates to apparatus for detecting and indicating variations in light intensity, and is especially suited to the measurement of light intensity which varies over a range of values including a normal value and a critical value, the latter marking the transition point between values which may be tolerated and values which represent unsatisfactory or harmful conditions.

Thus my invention possesses outstanding utility as applied to the measurement of oxygen content in the blood stream, for the purpose of determining whether a subject is receiving a sufficient oxygen supply. Certain standards have been adopted for such measurements, it being assumed, for instance, that the blood of a subject who is receiving an adequate supply of oxygen by breathing air at sea level, or low altitude, exhibits an oxygen content which is about 95% of the maximum content, and that an oxygen content of 80% or less is indicative of an inadequate or dangerous supply of oxygen. The oxygen content of 80% may therefore be considered a critical value, and when this value is reached, a warning signal is given, so that an adequate supply of oxygen may be restored. Apparatus for use in conducting measurements of this character are shown in the United States patents to Millikan Nos. 2,439,857 and 2,358,992.

One of the difficulties heretofore encountered in apparatus of this type arises as the result of variation of the efficiency of the amplifying system commonly employed to effect control of the indicating or signaling device. Thus it is a common expedient to measure the oxygen content of the blood by placing a light sensitive cell against one side of the ear lobe of a subject, to arrange a light source of known intensity at the other side of the ear lobe so that the amount of light falling on the light sensitive cell is proportional to the oxygen content of the blood, being reduced as the blood becomes darker with reduced oxygen content, and amplifying the cell output. The amplified output is then supplied to an indicator or signaling device, or both, to afford an indication of the oxygen content of the subject's blood. As the result of changes in temperature and atmospheric conditions, the gain of the amplifier will be correspondingly varied, and in order to ensure reasonably accurate indication of the intensity of light falling on the cell, it is necessary to calibrate the apparatus at frequent intervals and to effect appropriate adjustment of the gain of the amplifier. Obviously, changes in gain may occur during the course of a test, with the result that the indication becomes unreliable.

These and other difficulties are overcome by the instant invention, which contemplates an arrangement such that as the critical value is approached, the signal from the circuit containing the light sensitive cell becomes less, and reaches a minimum, substantially zero, when the critical value is reached. Since the gain of an amplifier at zero signal intensity has no effect on the amplifier output, accurate indication of the critical intensity, regardless of change of the amplifier characteristics, is assured.

More specifically, the invention contemplates, in a measuring system employing a light sensitive cell, an amplifier, and an indicating or signaling device, the use of a source of voltage which is so arranged in the cell circuit as to oppose the polarity of the cell, the potential of the source being such that the resultant voltage of the opposed cell and source is gradually decreased as the light intensity varies from a normal value toward a critical value, becoming substantially zero when the critical value is reached. A warning signal is then operated to give an indication of the critical value, and the operation of this signal does not depend on amplifier gain.

It will be appreciated that such an arrangement has further advantages. Thus the handling of large signal voltages or currents in an amplifier tends to produce distortion which can be overcome only by special amplifier design, whereas the handling of small voltages and currents is ordinarily effected with less distortion. In the present system, therefore, more accurate indication is achieved where accuracy is most needed, namely in the area of the critical or dangerous value.

It is a further object of the invention to provide a method of measuring hypoxia, or abnormally low oxygen content in the blood, by generating a signal of which the intensity is reduced as the oxygen content of the blood decreases from a normal value toward a critical value, becoming substantially zero when the critical value is reached.

Further objects and features of the invention will be apparent from the following description taken in connection with the accompanying drawings in which:

Figure 1 is a wiring diagram of an electrical instrument embodying the principles of the invention, and applicable to the measuring and indicating of varying light intensity, suitable for use for any of the purposes of the invention, and Figure 2 shows a photoelectric cell and light source applied to the earlobe of a subject.

Referring more particularly to the drawing, the generating circuit for the control signal is designated generally at 10, and includes a photoelectric cell 12 and a voltage source 13. The preferred cell is the barrier-layer type of selenium cell, characterized by reasonable stability and accuracy, but other cells functioning generally similarly may be employed. The gas tube type of cell is, generally speaking, less satisfactory than the ordinary selenium cell. In Figure 2 the photoelectric cell 12 is shown applied to the earlobe 17, which is interposed between the cell and a light source 14.

The negative terminal of voltage source 13 is connected through a potentiometer 15 and a resistor 16 to the negative terminal of cell 12; positive terminals of the cell and the voltage source are connected through resistor 18. The voltages developed by the source and the cell are thus opposed, being applied across a resistor 20 and condenser 23 to provide a resultant voltage which is suitably amplified for the control of an indicator, as hereinafter described. Switches 21 and 22 are represented in their normally closed position; these and other 5-position switches employed in the instrument are ganged, the fifth or uppermost position being the normal operating position, and the other four positions being employed for testing. A resistor 25 is connected between position four of switch 21 and an intermediate point on resistor 18, for a purpose hereinafter described. Since the circuit 10 embodies the principal features of novelty in the instrument, preferred values for the several resistances are given in the drawing, but it is to be understood that these values are not intended to be limiting.

These values, and the value of voltage source 13 are so selected with reference to the voltages developed by the photoelectric cell 12 over the intended range of illumination of the cell that under normal light intensities, the cell voltage predominates in the resultant voltage applied to resistor 20. As the light intensity falls off, approaching a critical value, the voltage developed by cell 12 decreases. When the critical value of illumination is reached, the resultant voltage is substantially zero, and as illumination continues to fall off, the voltage from the source 13 becomes predominant in the resultant voltage.

It will be obvious, however, that this sequence need not be followed in the practice of the invention. Thus the arrangement may be such that when normal light intensity is supplied to the cell, the voltage from source 13 will predominate in the resultant voltage at resistor 20, the critical value being approached as the light intensity falling on the cell increases, but in any event, and regardless of the use of the instrument, a resultant voltage of zero is approached as the critical light intensity is approached.

The amplifier and indicating or signaling devices employed with the energizing circuit 10 may vary widely, but are preferably constructed and arranged as illustrated in the drawing. Thus the resultant voltage appearing across resistor 20 is applied to the grid of amplifier tube 30 of the first amplifier stage, and to the cathode of tube 30 through resistor 31. Tube 32 serves as a plate load resistor for tube 30, the anode voltage applied to the latter being adjusted by variable resistor 33. The output of tube 30 is delivered through resistor 34 to tube 35 of the second amplifier stage, which contains a second tube 36, the cathodes of the two tubes being directly connected. A 5-position switch 37 is provided to couple the grids of tubes 35 and 36 in the second position only. A common cathode bias is provided for the two tubes by resistor 38, and the plate supply is adjusted by variable resistor 40, resistors 41 and 42 serving as plate loads.

The output of the second stage amplifier is fed by conventional means to tubes 50 and 51 of the third stage amplifier, connected in a push-pull circuit, the signal from tube 35 being supplied to the grid of tube 51, and the cathodes of the tubes being coupled. A 5-position switch 54 is arranged to connect the grids of the tubes in the first position only. The plate circuit of tubes 50 and 51 includes the winding 55 of a relay which controls the position of a switch 56, the latter being included in an indicator circuit comprising a voltage source 57 and a pair of indicator lights 58 and 59, the former being red and the latter green. The movable arm of switch 56 remains in the upper position, in which it is shown in the drawing, as long as the voltage developed by photoelectric cell 12 predominates in the resultant output from circuit 10, but drops to a lower position when the resultant output of circuit 10 becomes substantially zero. A microammeter 60 is arranged in series with a resistor 61 across the plates of tubes 50 and 51, the microammeter being provided preferably with a scale appropriate to the measurement to be made. Thus in the measuring of oxygen content of the blood, the scale of the meter 60 may be graduated to read in percentage content, the critical reading of 80% appearing at approximately the mid-point of the scale. The amplifier is supplied with plate current from a suitable source through resistor 63, voltage regulator tubes 64 and 65 being connected across the source in conventional manner to maintain the plate voltages substantially constant, and to afford decoupling for direct current and low frequency signals.

In adjusting the circuit for operation, the ganged switches 21, 22, 37 and 54 are turned to the lowest or number one position, in which switch 54 connects the grids of tubes 50 and 51 of the third amplifier stage. Variable resistor 62, in the plate circuit of that stage, is then adjusted so that no current flows through meter 60, and the latter, in the use of the apparatus for measuring oxygen content of blood, will show a reading of 80% corresponding to zero output of photoelectric cell circuit 10. When this adjustment is made, the relay winding 55 is de-energized to such an extent as to allow switch arm 56 to drop, and the red light 58 receives current from source 57, indicating existence of the critical condition.

The 5-position switches are then set to the second position, the grids of tubes 50 and 51 are no longer shorted, and the grids of tubes 35 and 36 of the second stage are shorted by switch 37. The variable contact on resistor 40 is then manipulated until no current flows through the meter 60, which is thus restored to the critical reading (80% oxygen in the case of hypoxia tests).

The 5-position switches are then adjusted to the third position in which the operation of the tubes in both the second and third stages is normal, but in which the grid and cathode of tube 30 are coupled through resistors 20 and 31, to short the tube. The anode voltage on the tube is then adjusted by varying resistor 33 until the meter 60 is again restored to the critical position corresponding to 80% oxygen content. At this point it is also convenient to check the operation of the signal lights 58 and 59. Any increase in resistance of 33 should cause the relay 56 to operate, the red light 58 being extinguished and the green or pilot light 59, indicating a more nearly normal condition, being energized. Resistor 33 should, of course, be so finally adjusted that the red light 58 is lighted and the critical reading appears on meter 60.

The 5-position switches are next turned to the fourth position, to connect the grid and cathode of tube 30 through resistor 25, and through a part of resistor 18, current from source 13 flowing through the latter. The positive potential applied to the grid of tube 30 of the first amplifier stage will now bring the reading on meter 60 to the normal reading of 95%, and the green pilot light 59 will be lighted, the operation being a check rather than an adjustment. In a preferred form of instrument employing an energizing circuit 10 in which the characteristics of the various elements are as given in the drawings, this potential is of the order of 15 millivolts.

For measuring the oxygen content of the blood, photoelectric cell 12 is now illuminated through the ear of the subject, or is otherwise positioned to receive the light of which the intensity is to be measured, and with the 5-position switches turned to the fifth or top position, which is the normal operating position, the potentiometer 15 is adjusted, if necessary, to restore the meter 60 to the normal optimum reading, 95% in the case of oxygen tests, and to supply current to green light 59. It will be observed that with this setting of the switches the D. C. voltage across the photocell 12 is quite small.

In the use of the device for hypoxia tests, reduction in the oxygen content of the blood darkens the blood, and the light delivered to the photoelectric cell 12 decreases. When the oxygen content drops to 80%, the voltage produced by the cell is equal and opposite in polarity to the voltage produced by current flow from the source 13 through the cell. The resultant voltage supplied across the resistor 20 is therefore substantially zero, the reading on the meter 60 is 80%, the green light 59 is extinguished and the red light 58 is illuminated, thus indicating the critical value of the oxygen content. At this point there is substantially no signal to be amplified, and no error can result from variation in amplifier again. As the oxygen content continues to decrease, the reading of the meter becomes lower, since the polarity on the grid of tube 30 decreases, but the red light 58 stays on.

It will be appreciated, therefore, that my invention contemplates the provision of an instrument of unusual stability, functioning in a critical range independently of changes in conditions which may affect amplifier again. It will also be perceived that in such an instrument, as distinguished from instruments of this general character heretofore employed, it is unnecessary, for the reasons hereinbefore indicated, to callibrate the instrument each time it is used, and the only adjustments normally required prior to a test are those effected in the third and fifth positions of the 5-position switches, as described hereinbefore.

Having thus described the invention, what is claimed as new and desired to be secured by Letters Patent is:

In apparatus for detecting and indicating a variation in oxygen content of the blood over a range including a normal content and a lower critical content, the combination with a photoelectric cell developing a voltage varying with the intensity of light impinging on the cell, of a source of light, said cell and light being adapted to be positioned in operative relation to each other and to an interposed membrane of the subject's body, a source of constant voltage, a circuit connecting said cell and source in opposition, a D. C. amplifier, means supplying the resultant of said voltages from said circuit to said amplifier, indicating means for indicating oxygen content of the blood, means controlling said indicating means in response to the output of said amplifier, and a resistance in said circuit for predetermining the voltages from said cell and source to such relative values that the resultant of said voltages when the oxygen content of the blood of the subject is depleted to a critical value is substantially zero, whereby control of said indicating means at the critical oxygen content is substantially unaffected by variation in gain of said amplifier.

References Cited in the file of this patent

UNITED STATES PATENTS

| Number | Name | Date |
|---|---|---|
| 1,724,870 | Belt | Aug. 13, 1929 |
| 2,245,124 | Bonn | June 10, 1941 |
| 2,347,200 | Lehde | Apr. 25, 1944 |
| 2,358,992 | Millikan | Sept. 26, 1944 |
| 2,442,462 | Kirschbaum | June 1, 1948 |